Patented June 23, 1931

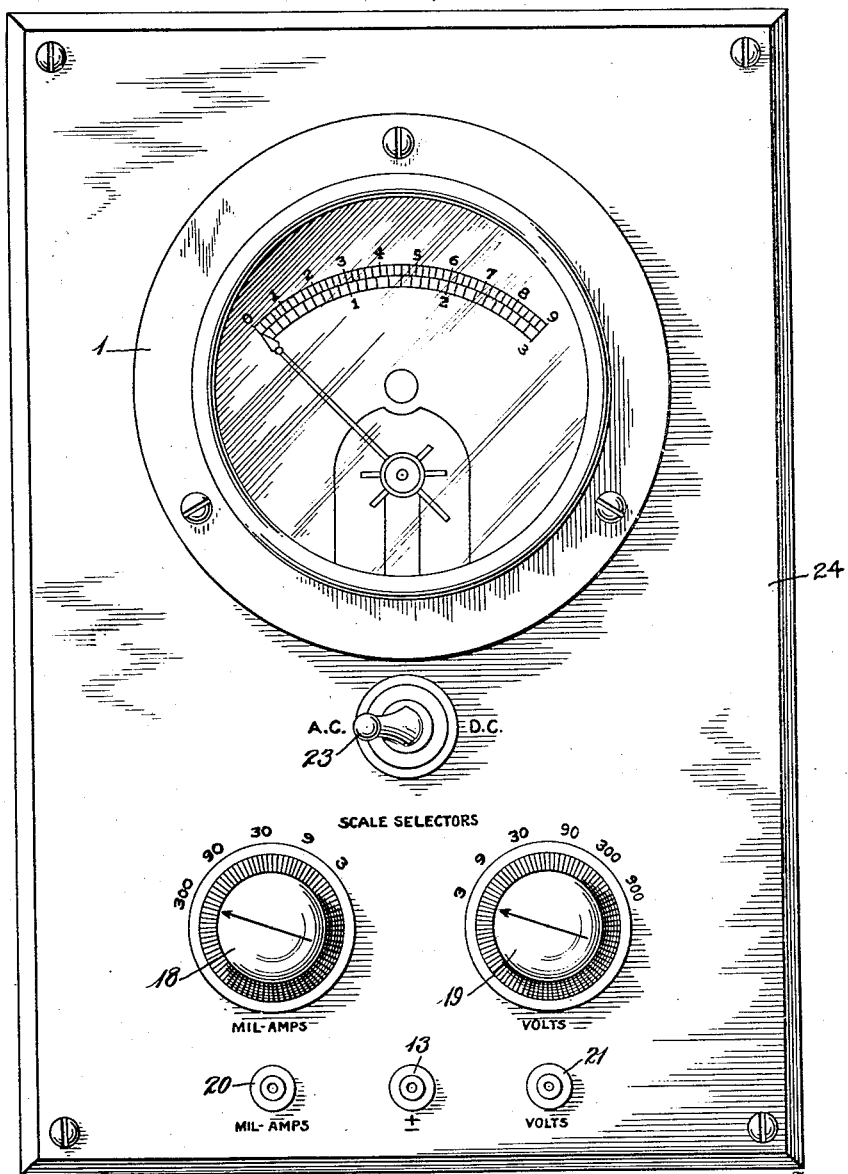

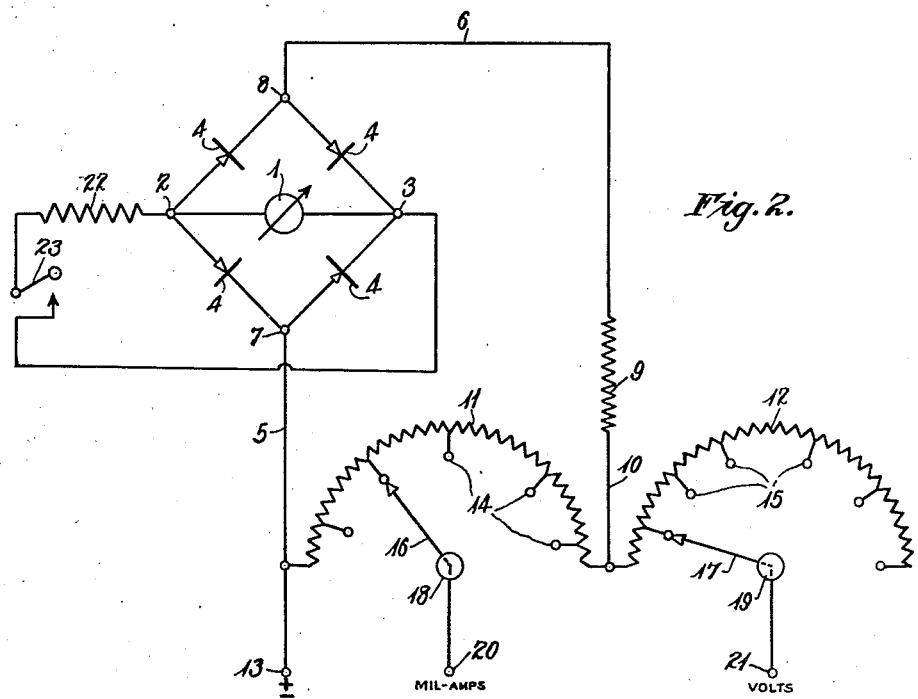
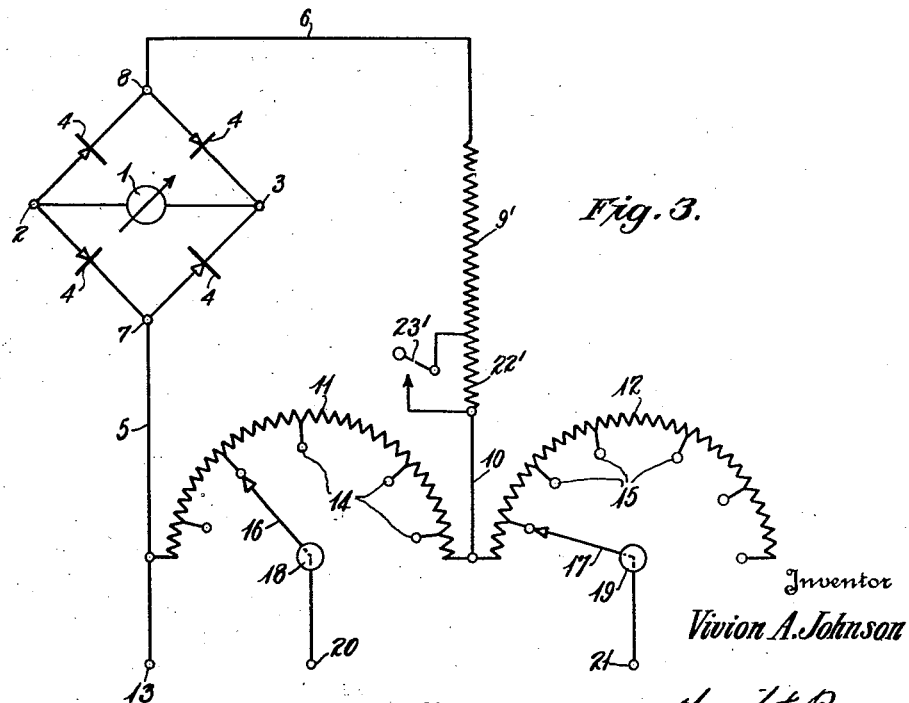

1,811,319

UNITED STATES PATENT OFFICE

VIVION A. JOHNSON, OF GREENWOOD, MISSISSIPPI, ASSIGNOR TO SUPREME INSTRUMENTS CORPORATION, OF GREENWOOD, MISSISSIPPI

ALTERNATING-CURRENT DIRECT-CURRENT METER

Application filed September 8, 1930. Serial No. 480,493.

This invention relates to a combined A. C. and D. C. meter and has for its object to provide a D. C. measuring instrument on which both the value of an A. C. and a D. C. current may be read directly from the same scale.

A further object is to provide a D. C. measuring instrument, measuring the output of a rectifier in which means are provided to change the value of current flowing in the meter in a ratio of 1:1.11 or viceversa in order that both A. C. and D. C. may be used on the same scale.

A further object is to provide a plurality of scale markings on the measuring instrument which shall be particularly adapted to measure values met in radio set testing.

Other objects will be apparent to those skilled in the art from the following description and appended claims.

In the drawings illustrating my invention:

Fig. 1 is a plan view of the preferred arrangement of the elements of my meter set upon a panel.

Fig. 2 is a diagrammatic showing of the circuits utilized in my meter set.

Fig. 3 is a diagrammatic showing of a slightly modified circuit which also may be used.

A meter 1 of the D'Arsenval type is connected to the output terminals 2 and 3 of a full wave rectifier composed of four individual rectifiers 4 connected in the well known bridge arrangement. These individual rectifiers may be of any desired type, such as copper oxide rectifiers, crystal rectifiers, or any other well known type. Two conductors 5 and 6 are connected to the input terminals 7 and 8 of the rectifier. A resistance 9 is provided in series with the conductor 6. A conductor 10 leads from the outer end of the resistance 9 to one terminal of a shunt resistance 11 connecting the conductors 5 and 10. Also connected to the conductor 10 is a series resistance 12. The conductor 5 is also connected to the neutral terminal 13 of my meter set. Each of the resistances 11 and 12 is provided with a series of taps 14 and 15 with which switch arms 16 and 17 respectively cooperate. Operating knobs 18 and 19 are provided for the switch arms 16 and 17 respectively. The "ampere" terminal 20 and the "volt" terminal 21 are connected respectively to the switch arms 16 and 17.

Connected in shunt with the meter terminals at 2 and 3 is a circuit containing a resistance 22 in series with a switch 23 which may be set in an open or a closed position.

Referring to Fig. 1 it will be seen that the layout of the elements as well as their markings are illustrated. Upon the face, a panel 24, the elements 1, 23, 18, 19, 20, 13 and 21 are appropriately mounted.

Meter 1 is of the plural scale type and contains two scales. The lower scale is provided with 30 divisions and carries scale markings from 0 to 3. The upper scale contains 45 divisions and carries scale markings from 0 to 9. The ranges which are to be read on the meter are 3, 9, 30, 90, 300, 900 volts and 3, 9, 30, 90, 300 milliamperes either A. C. or D. C. These various ranges are obtained in accordance with the setting of the members 23, 18 and 19 as will be described below.

In the closed position of the switch 23, the meter is adapted to measure A. C. values directly while in the open position of this switch the meter will read D. C. values directly. Therefore two indications "A. C." and "D. C." are provided for the switch 23 indicating the closed and opened positions respectively of said switch.

The taps with which the arms 16 and 17 are in contact determine the range of the meter for the values of current and voltage respectively. The set is provided therefore with markings adjacent the operating members 18 and 19 of the arms 16 and 17 respectively which markings are located in accordance with the positions of the various taps and indicate directly the range of the meter which results from the setting of the arms 16 and 17.

It will be seen that when A. C. is impressed upon the set, the rectifier will rectify each half of the A. C. cycle and a pulsating direct current composed of the successive half cycles of the A. C. will be passed through the meter. When D. C. is impressed on the set, the current will be directed by the rectifier in the proper direction through the meter. By changing the resistance 12 in series with the meter circuit, various voltage ranges are obtained, while by changing the amount of resistance in shunt with the meter circuit by the resistance 11 various current ranges are obtained.

The resistance 22 is provided so that both A. C. and D. C. may be read directly from the same scales on the meter. A meter of the type shown will read the average value of the current passing through it. The average value and effective value of a direct current is the same. However, the effective value of an alternating current is 1.11 as large as the average value. It is the effective value of the current which it is desired to measure in each case. The meter 1 is calibrated to read the effective values of A. C. directly. Thus it is clear that if the resistance network conditions remained unchanged and a direct current were passed through the meter 1 the resulting reading would be too high. By closing the shunt circuit containing the resistance 22 of the correct value, the applicant causes the current values of the D. C. passing through the meter itself to be lowered to such a point that the meter will read the correct value of direct current passing through the meter set. The introduction of the resistance across the terminals 2 and 3 changes the resistance of the path between these points somewhat. However, by the provision of the series resistance 9 any error that might tend to arise in some ranges of the meter is reduced to a negligible quantity. The presence of the low value shunt resistance 11 also decreases the value of this slight error.

The arrangement shown in Fig. 3 is the same as that shown in Fig. 2 except that the shunt resistance 22 and its control circuit has been eliminated. Instead, the resistance 9 is replaced by a resistance 9' having in series therewith a compensating resistance 22'. This resistance 22' is adapted to be short circuited by a switch 23' analagous to the switch 23 of Fig. 2. It will be noted that the resistance 11 will be quite small with respect to the resistance 9'. This will reduce any errors which might tend to arise in some ranges due to the short circuiting of resistance 22' to a negligible quantity.

To utilize the meter the terminals of the circuit to be measured are connected to terminal 13 and the proper terminal 20 or 21. The switch 23 is set for A. C. or D. C. as the case may be. The switch arm 16 or 17 being set to a convenient scale, the value of the current or voltage being measured can be read directly from the meter 1.

Various changes may be made in this embodiment of my invention within the scope of the appended claims.

Having described my invention, I claim:

1. A meter comprising a rectifier, a direct current measuring instrument for measuring the output of said rectifier, means for changing the current flowing in said instrument by a fixed small fractional part thereof under constant input conditions of said meter comprising a shunt circuit around said instrument including a resistance of a value considerably greater than that of the resistance of said instrument and means for opening and closing said shunt circuit.

2. A meter as set forth in claim 1 in which is provided a resistance of a relatively large value with respect to that of the instrument in series with both said instrument and shunt circuit.

3. A meter as set forth in claim 1 in which is provided a shunt resistance in shunt with said rectifier, instrument and shunt circuit, two input terminals for said meter, one of said terminals being connected to one end of said shunt resistance and means for connecting the other of said terminals selectively to spaced points along said shunt resistance.

4. A meter as set forth in claim 1 in which is provided a shunt resistance in shunt with said rectifier, instrument and shunt circuit, a series resistance, a neutral terminal and two alternative terminals for said meter, said neutral terminal being connected to one end of said shunt resistance and one end of said series resistance being connected to the other end of said shunt resistance, means for connecting one of said alternative terminals selectively to spaced points in said shunt resistance and means for connecting the other of said alternative terminals selectively to spaced points in said series resistance.

5. A meter comprising a rectifier, a direct current measuring instrument for measuring the output of said rectifier, means for changing the current flowing in said instrument by a fixed small fractional part thereof under constant input conditions of said meter comprising a resistance in series with said instrument, means for changing the effective value of said resistance by a small fractional part thereof, a shunt resistance in shunt with said rectifier, instrument and series resistance, two input terminals for said meter, one of said terminals being connected to one end of said shunt resistance and means for connecting the other of said terminals selectively to spaced points along said shunt resistance.

6. A meter comprising a rectifier, a direct current measuring instrument for measuring the output of said rectifier, means for changing the current flowing in said instrument by a fixed small fractional part thereof under constant input conditions of said meter comprising a resistance in series with said instrument, means for changing the effective value of said resistance by a small fractional part thereof, a shunt resistance in shunt with said rectifier, instrument and series resistance, a second series resistance, a neutral terminal and two alternative terminals for said meter, said neutral terminals being connected to one end of said shunt resistance, one end of said second series resistance being connected to the other end of said shunt resistance, means for connecting one of said alternative terminals selectively to spaced points in said shunt resistance and means for connecting the other alternative terminal selectively to spaced points in said second series resistance.

7. A meter comprising a rectifier, a direct current measuring instrument for measuring the output of said rectifier, a resistance network connected to said instrument and rectifier including an adjustable resistance for selecting a plurality of current ranges for said instrument and means for changing the current flow in said instrument by a small fractional part thereof, under each fixed condition of adjustment of said adjustable resistance and fixed input condition of said meter comprising means to change the resistance of a part of said network by a small fractional part thereof.

8. A meter as set forth in claim 7 in which said network also includes an adjustable resistance for selecting a plurality of voltage ranges for said instrument.

The foregoing specification signed at Greenwood, Miss., this 3rd day of Sept., 1930.

VIVION A. JOHNSON.